Sept. 29, 1931.  W. COMERFORD  1,825,581
RESILIENT SEAT
Filed Aug. 28, 1929
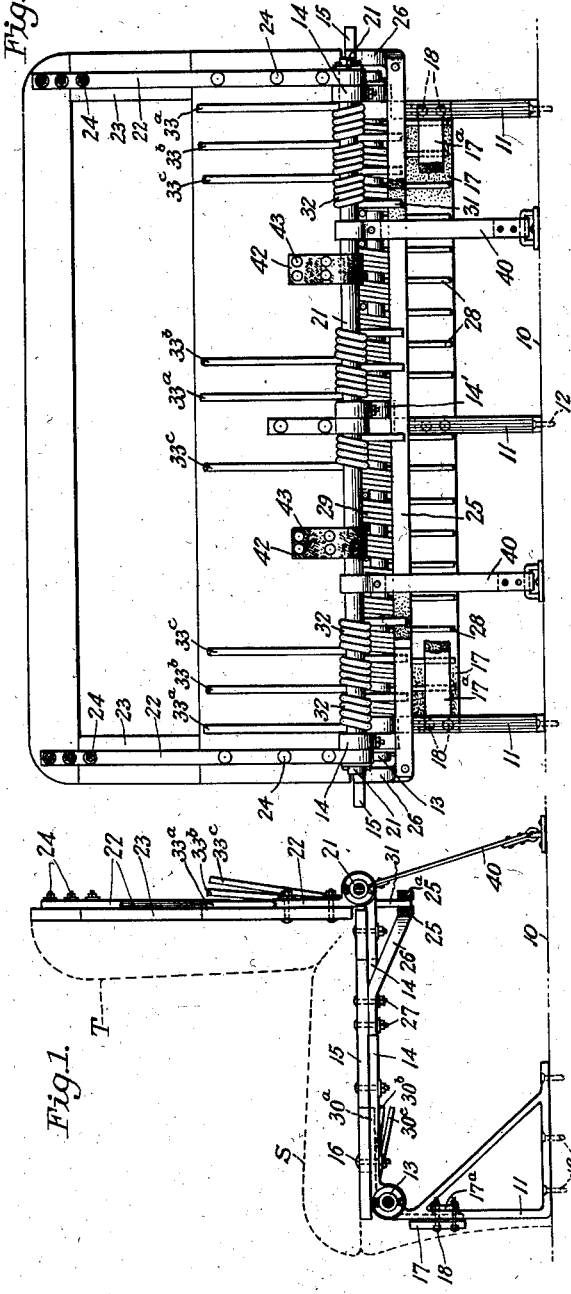
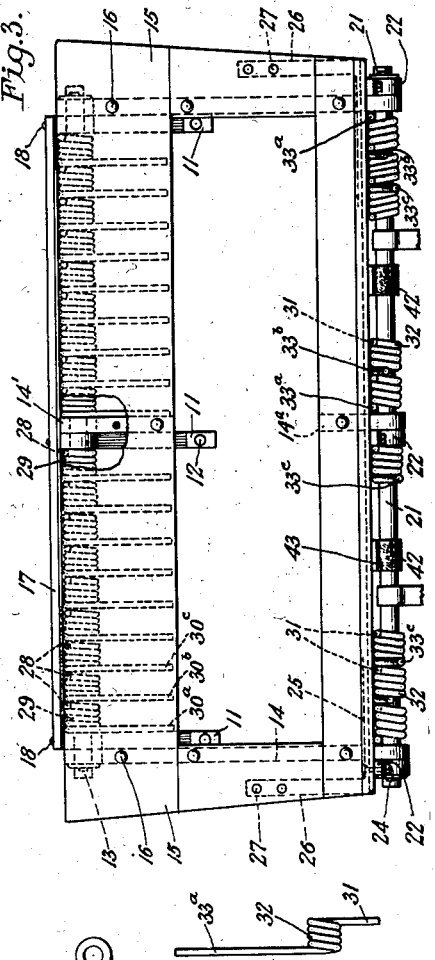
Inventor
WILLIAM COMERFORD
By
Attorneys Patented Sept. 29, 1931

1,825,581

UNITED STATES PATENT OFFICE

WILLIAM COMERFORD, OF BUFFALO, NEW YORK

RESILIENT SEAT

Application filed August 28, 1929. Serial No. 388,929.

This invention relates to improvements in resilient seats, and particularly concerns a type of resilient mounting in which movements of the seat are opposed by greater and greater returning forces.

Seats have been heretofore provided in which springs having substantially a uniformly increasing spring effect are arranged with backs likewise provided with springs of uniform compressional resistance. According to the present invention, however, the seat and back are provided with spring supporting members whose resistance increases by greater than an arithmetical ratio with respect to the load imposed and according to the distance of movement of the seat or back.

An illustrative form of practicing the invention is set forth on the accompanying drawings, in which the invention is represented as applied to an automobile seat.

In these drawings:

Figure 1 is an end view of such a seat and back.

Fig. 2 is a rear view of the assembly of the seat and back.

Fig. 3 is a corresponding plan view of the seat and back, without unholstery.

Fig. 4 is a detail view of a seat arm.

Fig. 5 is a detail view showing the arrangement of the plural seat springs.

Fig. 6 is a detail view showing a back spring.

According to the present invention, the seat comprises a substantially rigid base member to support the upholstery, this base member being resiliently mounted on a fixed bracket with a plurality of springs connected therebetween so that the springs successively come into action to limit the relative downward movement of the seat. Similarly, a back is pivoted to the seat and provided with connecting springs which likewise come successively into action.

In the drawings, the floor 10, illustrated as the floor of an automobile, has mounted thereon a plurality of supporting brackets 11, which are respectively fastened to the floor by screws 12, the upper ends of the bracket supporting a pivot tube 13, forming the axis of movement for a plurality of seat supporting arms 14 extending from front to rear of the seat and fastened to the base member 15 of the seat by the securing bolts 16. In the particular illustration, the central seat arm 14' is shorter than the others, in view of the formation of the base member 15 of front, rear and side members with a space therebetween. The brackets 11 likewise support near their tops the spring stop bars 17, 17a at front and back, secured to the brackets 11 by bolts 18, and provided on their adjacent or inwardly directed faces with felt strips to prevent rattling of the springs.

At the rear end of the base member 15 of the seat is supported the back arm 14a opposite the short front arm 14', and having an eye at its rear end in alinement with the eyes of the longer seat arms 14, whereby to support the back pivot tube 21. This back pivot tube carries the pivotal members 22 having the upstanding back arms to support the base member 23 of the back, and being securely bolted thereto by bolts 24.

The seat base member 15 likewise is fixedly connected by bolts 27 to a downwardly and rearwardly extending bracket 26 having the striking plates 25, 25a thereon to receive the lower ends of the back springs; these striking plates 25, 25a being likewise provided with felt strips to prevent rattling.

A plurality of front or seat springs is provided, each having downwardly extending ends 28 received between the felt liners of the stop bars 17, 17a; the central coils 29 disposed around the front pivot tube 13; and the rearwardly extending ends 30a, 30b and 30c in the respective seats. These springs are arranged in sets of three in the illustrative form shown, one member of each set being always in contact with the bottom of the seat base member 15, while the other members 30d and 30c of each seat have slightly more acute angles so that they are normally free of this seat member when the seat is unoccupied, in which condition the upper member 30a only supports the weight of the seat and back. As weight is brought upon the seat S, the base member 15 is caused to rock in a clockwise direction about the front pivot 13, so that the base member is brought successively against the spring members 30d, and then against the spring members 30c as the load increases. The torsional resistance of each of these members may be regarded as increasing practically in arithmetical progression: so that for the first portion of this downward movement, a slight frictional resistance by the spring 30a is imposed, enough to give an easy yielding and return for a small downward movement. When the seat base 15 picks up the spring members 30b a greater resistance is imposed, and finally when the seat member 15 picks up the last spring members 30c, the resistance is very great, since the spring members 30a and 30b have been increased in arithmetical progression, and have assisted one another in succession and are now assisted by the spring members 30c.

Similarly, the rear or back springs are provided with the downwardly extending arms 31 received between the felt strips on the stop bars 25, 25a; with coils 32 passing around the rear pivot tube 21, and with the upwardly extending arms 33a, 33b, 33c disposed successively at different angles in each set of three as illustrated. In the same manner as for the seat, a slightly backward pressure upon the back upholstery T causes the movement of the base member 23 of the back with the first springs 33a of each set, giving an easy yielding effect for this slight movement. As soon as the springs 33b are taken up, a greater resistance is occasioned, and finally when the springs 33c are taken up, an increase far greater than the normal resistance of a simple spring is produced.

The seat and back may be provided with the usual upholstery S and T as indicated in dotted lines in Fig. 1.

It is preferred to limit the upward movement of the base member 15 of the seat to maintain a slight initial tension upon the first springs 30a, by the provision of strip members 40 connected around the tube 21 and to the floor 10 of the vehicle. Similarly, straps 42 are provided to pass around this tube and prevent excessive forward movement of the back base member 23, being attached by bolts 43 to the base member 23 of the back and by suitable means to the underside of the seat base member 15.

It is obvious that the invention is not limited to the form of construction illustrated, but that it may be modified in many ways within the scope of the appended claims.

What I claim as new and desire to secure by Letters Patent is:

1. A resiliently supported seat comprising fixed floor-supported members, a pivot mounted on said fixed members, a seat on said pivot, and a plurality of sets of springs each having a central coil surrounding said pivot, a depending end engaged by said fixed members, and a rearwardly directed end engageable with said seat, one spring of each set being normally engaged with the seat, and the other springs of the sets being successively engaged by the seat in its downward rocking movement.

2. A resilient seat comprising fixed floor brackets, a seat and a back, said seat being pivoted to said brackets and said back pivoted to said seat, in combination with pluralities of sets of seat and back springs, each of said springs having projecting ends, one end of each seat spring being secured to the floor brackets and the other ends being located in the path of movement of the seat, one spring of each set of seat springs being normally engaged with the seat and the others normally free therefrom and spaced apart so that they are successively engaged as the seat is rocked against the resilient yielding of said respective first springs, each of said back springs having one of its ends engaged fixedly with its seat and the other end located in the path of movement of the back, one spring of each set of back springs being normally engaged with the back and the others normally free therefrom, said other springs being successively engaged as the back is rocked against the resilient yielding of the first back springs.

3. A seat as in claim 2, with means to maintain said seat engaged with said first seat springs under a normal initial tension.

4. A resiliently supported back and seat construction comprising a seat member, a pivot mounted on said seat member, a back member mounted on said pivot and a plurality of sets of springs each having a center coil surrounding said pivot and engaged by said seat, and another end engageable with said back, one set having its said other end engaged with said back normally and the other ends of the other springs being located in the path of movement of said back and spaced at different distances therefrom when the back member is in unoccupied position whereby they are successively engaged by the back in its rocking movement.

5. A resiliently supported back and seat construction comprising a first member, a pivot supported on said first member, a second member mounted on said pivot, a plurality of sets of springs each having a central coil surrounding said pivot and a pair of ends directed radially with respect to said pivot, one of said ends of each spring being fixedly engaged with one of said members and held thereby, the second end of one of said sets being normally engaged with said other member, the other springs of each set being normally disengaged from said other member and located in the path thereof at spaced intervals so that they are successively engaged by said other member during the rocking movement thereof.

In testimony whereof, I affix my signature.

WILLIAM COMERFORD.